US006947026B2

(12) United States Patent
Mattson

(10) Patent No.: US 6,947,026 B2
(45) Date of Patent: *Sep. 20, 2005

(54) SECURABLE MOUSEPAD WITH SLIDABLE TRAY AND A METHOD OF USING SAME

(75) Inventor: Brian M. Mattson, Chicago, IL (US)

(73) Assignee: Patents + TMS, P.C., Chicago, IL (US)

(*) Notice: Subject to any disclaimer, the term of this patent is extended or adjusted under 35 U.S.C. 154(b) by 425 days.

This patent is subject to a terminal disclaimer.

(21) Appl. No.: 10/074,154

(22) Filed: Feb. 12, 2002

(65) Prior Publication Data

US 2002/0070642 A1 Jun. 13, 2002

Related U.S. Application Data

(63) Continuation of application No. 09/761,997, filed on Jan. 17, 2001, now Pat. No. 6,362,809, which is a continuation-in-part of application No. 09/572,214, filed on May 17, 2001.

(51) Int. Cl.[7] .................................................. G09G 5/00
(52) U.S. Cl. ................... 345/156; 248/346.01; 345/163
(58) Field of Search ................................ 345/156, 157, 345/163; 312/283, 231; 248/346.01, 918, 118; D14/114

(56) References Cited

U.S. PATENT DOCUMENTS

| | | | | |
|---|---|---|---|---|
| 4,799,054 A | * | 1/1989 | House ......................... 345/163 |
| 5,405,168 A | | 4/1995 | Holt | |
| D370,472 S | * | 6/1996 | Scianna ...................... D14/458 |
| 5,542,637 A | * | 8/1996 | Schriner ................. 248/346.01 |
| D388,416 S | * | 12/1997 | Jones .......................... D14/458 |
| 5,692,815 A | * | 12/1997 | Murphy ....................... 312/283 |
| 5,791,620 A | | 8/1998 | Carcich, Jr. | |
| 5,971,340 A | | 10/1999 | Murphy | |

* cited by examiner

Primary Examiner—Kent Chang
(74) Attorney, Agent, or Firm—Patents & TMS, P.C.

(57) ABSTRACT

A password security apparatus, a mousepad and a method of using the same are provided. The apparatus, the mousepad, and the method may include a writing surface contained within the mousepad or apparatus. The writing surface may be disposed between layers of the mousepad, include the bottom surface of the mousepad, or be contained on a slidable tray located between layers. Contained on the writing surface may be a grid having spaces for the addition of information. The information may be related to websites that a computer user may visit on a computer network such as, for example, the Internet. Further, the information such as, for example, user identification information and/or password information that may be related to the websites may be contained thereon and locked in a concealed location by the security apparatus.

7 Claims, 4 Drawing Sheets

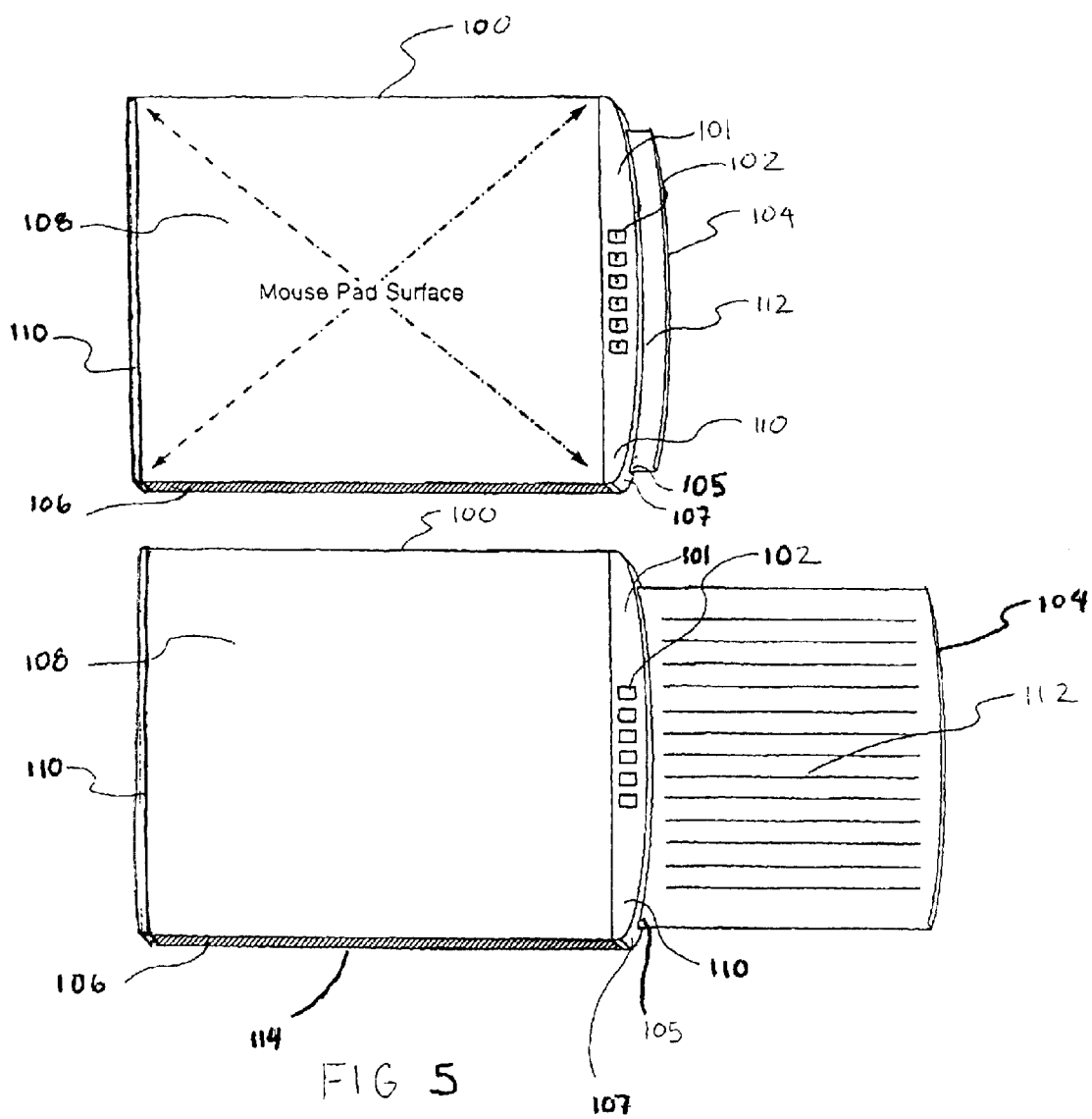

SECURABLE MOUSEPAD WITH SLIDABLE TRAY AND A METHOD OF USING SAME

This application is a continuation of U.S. patent application Ser. No. 09/761,997 filed on Jan. 17, 2001 now U.S. Pat. No. 6,362,809, which is a continuation-in-part of U.S. patent application Ser. No. 09/572,214, filed May 17, 2001.

BACKGROUND OF THE INVENTION

The present invention generally relates to a mousepad. More specifically, the present invention relates to a securable mousepad having a hidden writing surface as well as a method of using the same. Further, the present invention relates to a mousepad having a hidden writing surface contained within layers of the mousepad and/or on an internal section separable from a remainder of the mousepad.

It is, of course, generally known to provide mousepads to be used as a surface on which a mouse may be transferred thereon used generally in connection with a computer system. The mousepad may be composed of a layer of rubberized material having a gripping surface on one side for gripping a desk, and a cloth material contained on an opposite side for a computer mouse to be utilized thereon. Generally, the mousepad is comprised of two layers, the rubberized material and the cloth material, both of which are attached to one another via an adhesive. In use, the mousepad generally may be placed atop a desk or a table relatively close to a computer system. A computer mouse, extending from the computer system, may be utilized on the mousepad. Specifically, a smooth surface may allow a rollerball contained with the mouse to roll thereby controlling a cursor or an arrow, for example, on a computer screen.

Further, it is also generally known to utilize a global computer network such as, for example, the Internet on a computer system via a computer mouse utilized on a mousepad. The Internet includes many websites that may require personal information to be entered thereinto. Further, access to many websites is restricted to individuals who have permission to use the website from a website administrator. Access to these restricted websites may generally be achieved by entering a user name and/or an identification and/or a password.

However, often different user identifications or names are used as well as different passwords for each website. Further, for security purposes, the password for any and/or all websites may be changed on a regular basis such as, for example, monthly. Consequently, it may be difficult for an individual to keep track of the multitude of user identifications and passwords that an Internet user must use. Further, the variety of passwords that may be used by a single individual for access to a specific website may be easily confused or forgotten. Further, passwords should be contained in a secure or otherwise secret location to keep the passwords private and inaccessible to other individuals.

A need, therefore, exists for an improved mousepad, a password security apparatus and a method of using the same that overcome the deficiencies noted herein.

SUMMARY OF THE INVENTION

The present invention provides a mousepad, a password security apparatus and a method of using the same. More specifically, the present invention provides a mousepad, a password security apparatus and a method of using the same that allow an individual to contain a plurality of user identification names and/or passwords in a secure and/or discrete location.

In an embodiment of the present invention, an apparatus for storing information is provided. The apparatus has a mousepad having a thickness and further having a top surface and a bottom surface. A removable section is contained in the mousepad and removable from the mousepad wherein the removable section has a thickness less than the thickness of the mousepad. An accessible writing surface is disposed on the removable section.

In an embodiment, the security device is associated with the mousepad providing selective access to the accessible surface.

In an embodiment, the accessible surface is a slidable tray.

In an embodiment, the writing surface has a grid.

In another embodiment of the present invention, the mousepad contains an internal frame having an outside and inside surface. The internal frame has a substantially rectangular cross-section defining an enclosure. The frame contains a base defining a storage cavity, an upper planar surface and four sidewalls. A slidable tray is contained within an opening located on a sidewall of the frame. A horizontal track is located on two opposite sidewalls of said frame for contacting the sliding tray. A writing surface is provided on the sliding tray. The track may contain flanges to guide the motion of the sliding tray and secure the sliding tray in a locked position.

In an embodiment, the security device is associated with the mousepad providing selective access to the accessible surface.

In an embodiment, the accessible surface is a slidable tray.

In an embodiment the frame houses the accessible surface in concealed position.

In an embodiment, the writing surface includes a grid.

In yet another embodiment of the present invention, the frame is substantially as described above containing an upper surface for the placement of a mousepad thereon.

In the embodiment, the frame contains has an indentation capable of placing a mousepad thereon.

In another embodiment of the present invention, a method is provided for using a mousepad and for storing information. The method comprises the steps of: providing a mousepad having a writing surface contained within the mousepad; securing the writing surface in the mousepad; selectively exposing the writing surface; and concealing the writing surface within the mousepad.

In an embodiment, a slidable tray containing a writing surface is provided.

In an embodiment, a grid is provided on the writing surface, and information is written in the grid.

In an embodiment, a locking apparatus is provided.

It is, therefore, an advantage of the present invention to provide a password security apparatus, a mousepad and a method of using the same that provide a hidden location for information.

Another advantage of the present invention is to provide a password security apparatus, a mousepad and a method of using the same that provide a writing surface within a mousepad for concealing computer password information.

A further advantage of the present invention is to provide a password security apparatus, mousepad and a method of using the same that are integrated within a computer mousepad.

A still further advantage of the present invention is to provide a password security apparatus, a mousepad and a method of using the same that are located relatively close to a computer system of the user.

Yet another advantage of the present invention is to provide a password security apparatus, a mousepad and a method of using the same that allow access to the concealed information when needed by a user.

Moreover, an advantage of the present invention is to provide a password security apparatus, a mousepad and a method of using the same that provide a grid on a writing surface to contain website user identification and password information thereon.

A further advantage of the sliding tray is to conceal computer password information within the housing of the mousepad and to provide a method to move the computer information from a concealed to an exposed position for information retrieval.

A lock feature of the present invention is provided to keep concealed information from being exposed except when unlocked by the user.

Additional features and advantages of the present invention are described in, and will be apparent from, the detailed description of the presently preferred embodiments and from the drawings.

BRIEF DESCRIPTION OF THE DRAWINGS

FIG. 4 illustrates a perspective view of an alternate embodiment of a mousepad of the present invention.

FIG. 5 illustrates a perspective view of an alternate embodiment of a mousepad of the present invention.

DETAILED DESCRIPTION OF THE PRESENTLY PREFERRED EMBODIMENTS

The present invention generally relates to a password security apparatus, a mousepad and a method of using the same. More specifically, the present invention provides a password security apparatus, a mousepad and a method of using the same that allow a user of a computer to store and maintain private information such as, for example, user identification names and/or passwords for a computer or an Internet website.

Figure 1:
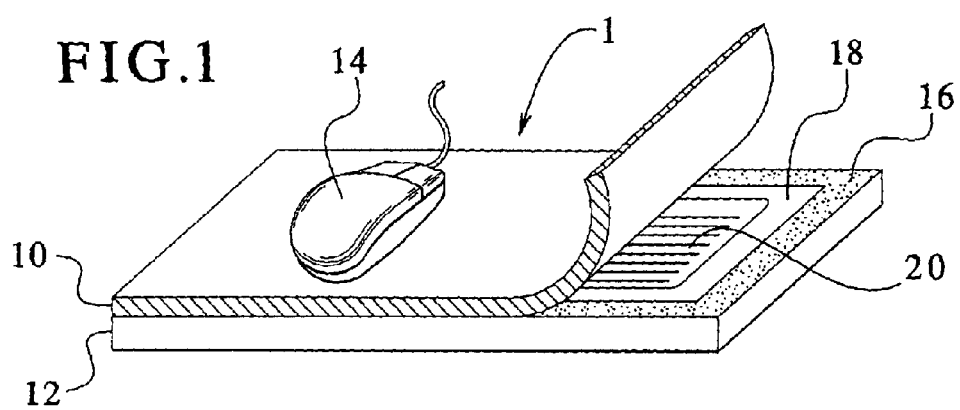
FIG. 1 illustrates a perspective view of a mousepad in an embodiment of the present invention.

Referring now to the drawings, wherein like numerals refer to like parts, FIG. 1 generally illustrates a mousepad 1 having a top layer 10 and a bottom layer 12. The top layer 10 and the bottom layer 12, respectively, may be composed of a rubberized material, a felt or cloth-type material or any other type of material generally that may be apparent to those skilled in the art. Preferably, the top layer 10 may be composed of a cloth-type material to aid in rolling a mouse 14 thereacross that may be connected to a computer system for control of a cursor or an arrow on a computer screen (not shown). The top layer 10 may be removably attached to the bottom layer 12 via a fastener 16. The fastener 16 may be a removable adhesive, a hook and loop type fastener, a magnetic fastener or any other type of fastener that may be apparent to those skilled in the art for removably attaching the top layer 10 to the bottom layer 12. Further, the fastener 16 may be contained around a periphery of the top layer 10 and the bottom layer 12.

Disposed on a top surface 18 of the bottom layer 12 may be a writing surface 20. The writing surface 20 may be composed of cardboard, paper, plastic or any other material that may be apparent to those skilled in the art that may allow information to be written thereupon. For example, the writing surface 20 may be composed of a rigid, plastic writing surface that may be written upon via a marker such as, for example, a dry-erase marker. In addition, information that may be printed upon the writing surface 20 may be removable from the writing surface 20.

Further, the writing surface 20 may be a pad of paper having a plurality of layers that may be contained within the bottom layer 12. As a user enters information on the writing surface 20, the user may remove the top layer from the pad of papers thereby exposing a clean sheet of paper thereunder.

In use, the mousepad 1 may be located near a computer system and may have a mouse 14 utilized thereon. As the user uses the computer system and must retrieve a user ID and/or password information, the user may peel back the top layer 10 from the bottom layer 12 thereby exposing the writing surface 20 on the top surface 18 of the bottom layer 12. The user may then enter information or retrieve information contained on the writing surface 20 to aid the user in using the computer system, for example, providing access to a website. After use, the user may then re-attach the top layer 10 to the bottom layer 12 via the fastener 16. When the top layer 10 is fully attached to the bottom layer 12 via the fastener 16, the writing surface 20 may be completely hidden from view.

Figure 2:
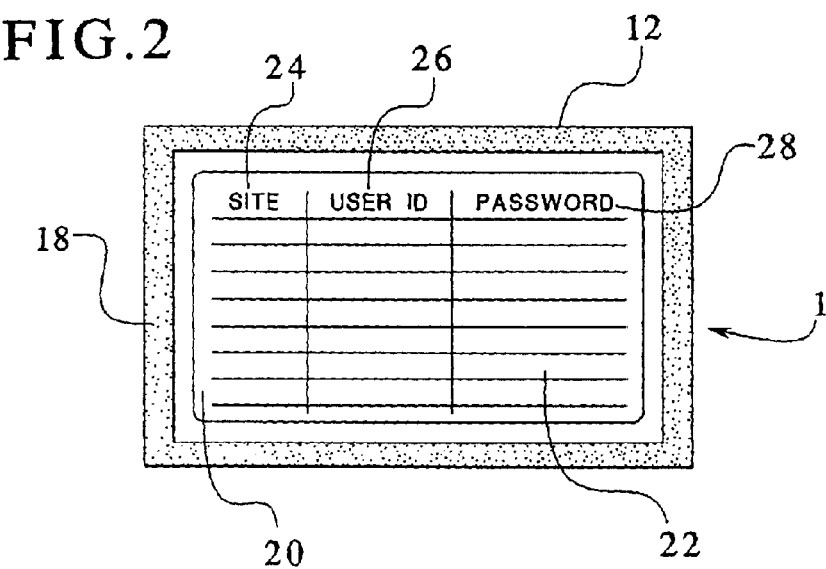
FIG. 2 illustrates a writing surface having a grid thereon in an embodiment of the present invention.

FIG. 2 generally illustrates the top surface 18 of the bottom layer 12 of the mousepad 1. Contained on the top surface 18 may be the writing surface 20. Contained on the writing surface 20 may be a grid 22 having a plurality of rows and columns. The grid 22 may contain areas to enter information thereupon. The information may be related to a website location 24, a user identification 26 and/or a password 28. The grid 22 may aid a user in remembering his or her identification names and/or passwords as they relate to particular sites on a computer network such as, for example, the Internet. It should be understood that any information may be written on the grid 22 and should not be limited as herein described. Further, the grid 22 may be presented in any way that may aid a user in storing and keeping information as may be apparent to those skilled in the art. The writing surface 20 may also alternatively be blank and not contain any information except that entered by the user.

Figure 3:
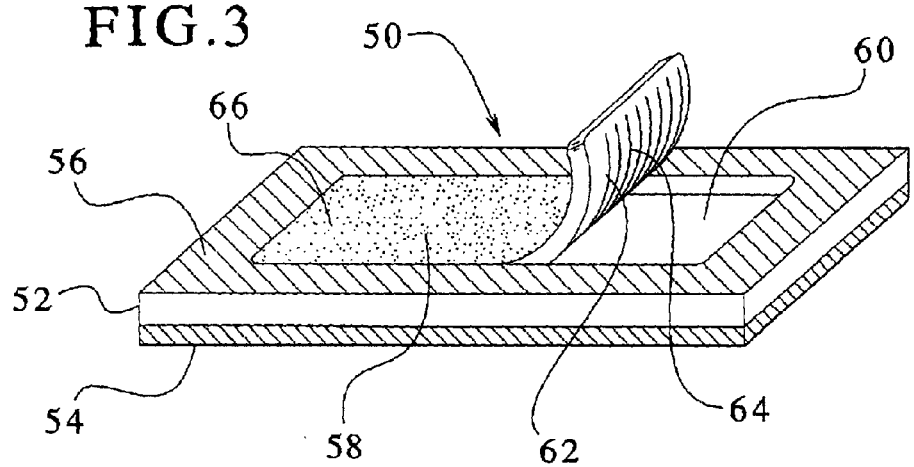
FIG. 3 illustrates a bottom-side view of a mousepad in another embodiment of the present invention.

FIG. 3 illustrates a bottom-side view of another embodiment of a mousepad 50. The mousepad 50 may have a first layer 52 and a second layer 54. The first layer 52 may be composed of the rubberized material or any other material that may be apparent to those skilled in the art that may be used for mousepads. The second layer 54 may be composed of a cloth-type material to aid a computer mouse in rolling thereupon. Further, the first layer 52 may have a textured surface 56 for gripping a desk or a table.

The first layer 52 may have a removable section 58 that may be cut into the first layer 52. The removable section 58 may be contained within a space 60 within the first layer 52. The removable section 58 may peel from the space 60 or may otherwise be removed from the space 60 when the mousepad 50 is, for example, picked up and moved. The space 60 may be cut into less than an entire thickness of the first layer 52 so that the removable section 58 is contained primarily in the first layer 52. When the mousepad 50 is arranged with the second layer 54 on top and the first layer 52 contacting a desk or a table, the removable section 58 and the space 60 may be hidden from view.

Contained on the removable section 58 may be a writing surface 62 having an area for writing information thereupon. The writing surface 62 may have a grid 64 that may be similar to or identical to the grid 22 as shown in FIG. 2.

For example, the writing surface 62 may consist of a rigid, plastic material that may be written thereupon with, for example, a dry erase marker. Alternatively, the writing surface 62 may be any material capable of being written thereon using any type of marking instrument, such as, for example, a pen, a pencil, a marker, or the like. Further, the removable section 58 may be a pad of paper that may fit within the space 60. The pad of paper may be written upon using a writing instrument. When a top page of the pad of paper is no longer needed, it may be removed thereby exposing a clean page for information to be written thereupon.

In use, the mousepad 50 may be oriented with the second layer 54 disposed atop the first layer 52 or inverted from the orientation shown in FIG. 3 with the textured surface 56 adjoining a desktop, for example. When a user references the information contained upon the writing surface 62 or wishes to add information to the writing surface 62, the first layer 52 of the mousepad 50 is lifted thereby exposing the removable section 58. The user may then expose the writing surface 62 of the removable section 58. The user may then reference, for example, the grid 64 for information contained thereon or otherwise add information thereto. When the user is finished using the writing surface 62, the first layer 52 is then placed securely over the removable section 58 within the space 60. The side including the textured surface 56 of the removable section 58 may also include an adhesive 66 or other known fastener to secure the removable section 58 to, for example, a desktop. As a result, the first layer 52 of the mousepad 50 may be more easily separated from the removable section 58 when exposure of the writing surface is desired. In addition, the removable section 59 may remain secured to, for example, a desktop.

FIG. 4 illustrates another embodiment of a mousepad 100 having a security apparatus 101 that may be locked and unlocked using, for example, a numbered key pad 102. The security apparatus 101 may be implemented to lock a slidable tray 104 into position within a first layer 106 of the mousepad 100. It should be understood that the security apparatus 101 should not be construed as limited to the numbered key pad 102, but other electrical and/or mechanical locking devices, such as, for example, retinal and fingerprint scanners, and other devices may be implemented by one skilled in the art to provide access to the slidable tray 104. The security apparatus 101 may be locked and unlocked, for example, by entering a numbered code into the numerical key pad 102. Upon entering the numbered code into the numerical key pad 102, the security apparatus 101 may lock the slidable tray 104 into a concealed position or unlock the slidable tray 104 to allow access to a writing surface 112 on the slidable tray 104.

The second layer 108 and the first layer 106 may be constructed in a manner substantially as previously described with reference to FIG. 1. The second layer 108 may have of a smooth cloth-type material, and an underside of the first layer 106 may have a textured surface for gripping a surface on which the mousepad 100 may be placed. The numbered key pad 102 may be contained within a frame 110 on opposite ends of the mousepad 100. The frame 110 may serve as a housing in which the slidable tray 104 may be inserted in a concealed position and may guide the slidable tray 104 from an opening between the first layer 106 and the second layer 108 from which the tray 104 may extend. The frame 110 may be made of a suitable hard plastic, such as, for example polyethelene or the like, that may be adhered to the first layer 106 and the second layer 108 by, for example, an adhesive or other connecting means. Of course, the frame 110 may be made of any suitable material known to those skilled in the art.

As shown in FIG. 4, the slidable tray 104 may be partially exposed in a locked position. The slidable tray 104 may have a writing surface 112, as previously described with reference to FIG. 4. The writing surface 112 may be used to record and maintain private information, such as, for example, user identifications and passwords. The writing surface 112 may be composed of, for example, a plastic surface that may be written upon using, for example, a marker. Of course, the writing surface 112 may be other types of material, such as, for example, paper. In addition, paper may be formed in a pad in which a top sheet of the pad may be removable. The writing surface 112 may also have a chart as generally shown and described with reference to FIG. 2.

FIG. 5 generally illustrates the writing surface 112 of the slidable tray 104 shown in the ejected position. The slidable tray 104 may be contained within the enclosed cavity of the frame 110. The tray 104 may extend from an opening 105 in the sidewall 107 at one end of the frame 110. The tray 104 may include the numbered keypad 102. Contained on the top surface 112 of the slidable tray 104 is the writing surface 112 as previously described. The writing surface 112 may be a dry erase board or a pad of paper having a plurality of layers that may be removed to expose sheets of paper, for example, located thereunder. In the ejected position, the user may record and reference information, such as user identifications and passwords necessary, for example, to access websites.

In use, the user may expose the writing surface 112 of the slidable tray 104 by entering a code into the numbered key pad 102, or other security apparatus. The user may then manually slide the tray 104 to the ejected position. The security apparatus 102 may lock the sliding tray 104, stored within the first layer 106 of the mousepad 100, in a secured position to protect privacy of, for example, Internet access codes and other user identification information. Upon entering a code on the number key pad 102 and ejecting the slidable tray 104, the user may then enter or retrieve information contained on the writing surface 112. After use, the user may then manually insert the slidable tray 104 through the opening in the frame 110 into the mousepad 100 and lock the security apparatus 110. Locking may occur automatically upon insertion of the slidable tray 104. Alternatively, the user may be required to lock the locking apparatus 110. After the security apparatus 102 is locked, the slidable tray 104 may be inaccessible and hidden from view.

Figure 6:
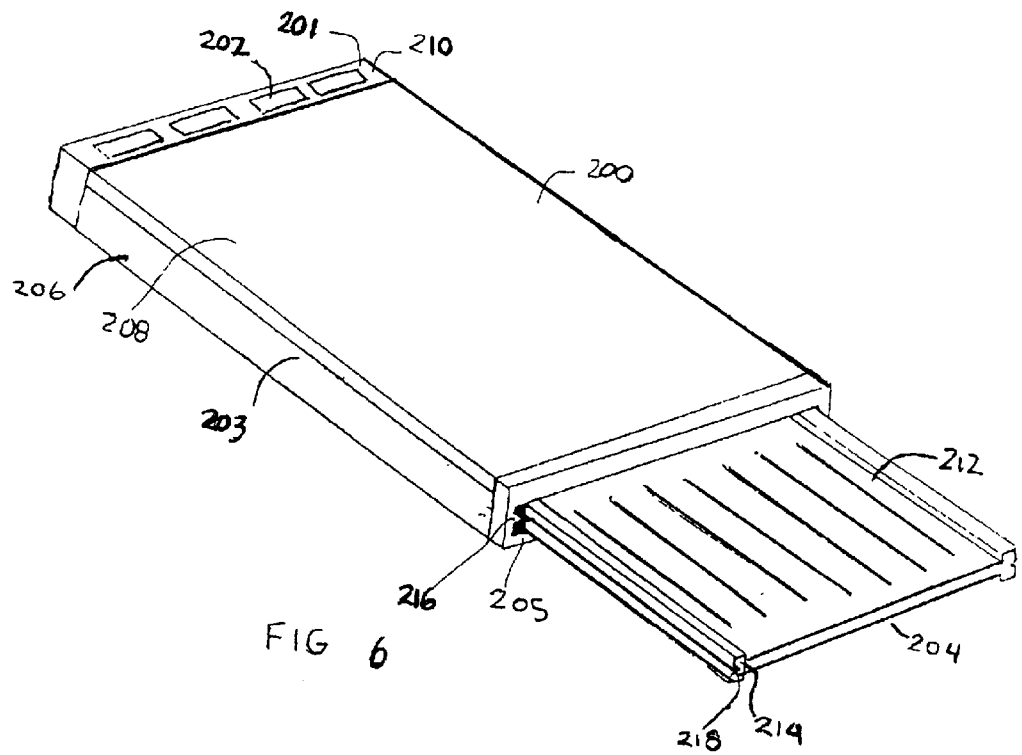
FIG. 6 illustrates a perspective view of an alternate embodiment of a mousepad of the present invention.

FIG. 6 is another embodiment of the present invention wherein the sliding tray 204 may have, for example, an exterior frame 214 that may be guided in a track 216 located within the interior of the mousepad 200. The exterior frame 214 may contain a groove 218, or any other machined shape, in which the track 216 may guide the sliding tray 204. The track 216 may extend partially or completely into the interior of the mousepad 200.

Figure 7:
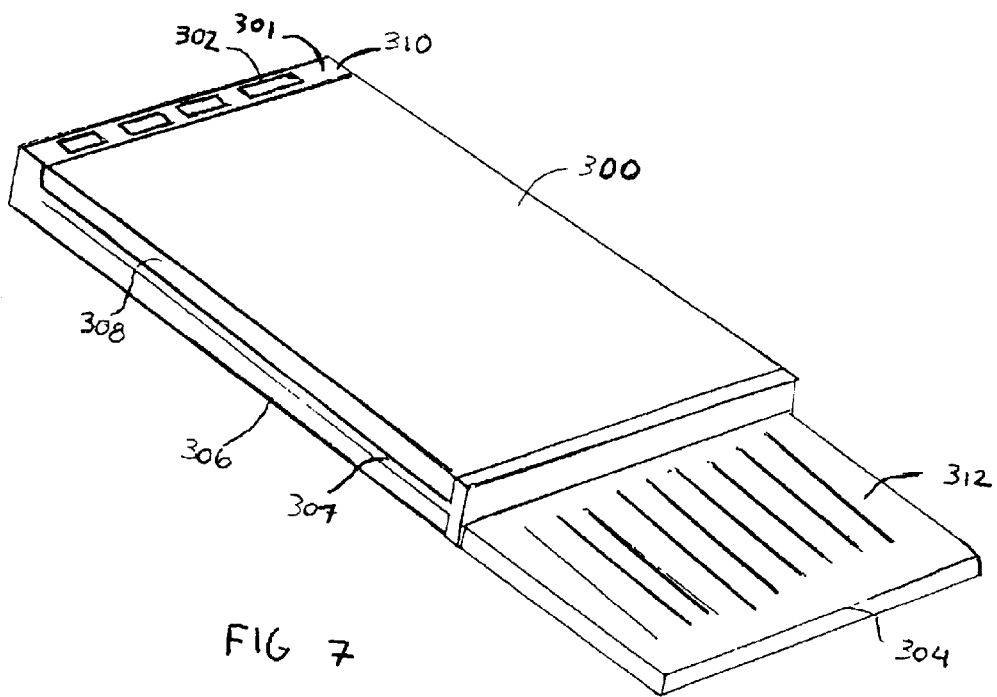
FIG. 7 illustrates a perspective view of an alternate embodiment of a mousepad of the present invention.

FIG. 7 illustrates an alternate embodiment of a mousepad 300 containing a slidable tray 304 which may form a bottom surface 306 of a mousepad 300. The bottom surface 306 of a sliding tray 304 may be constructed from a material suitable to allow the tray 304 to slide, for example, on a desk or table. Alternatively, the bottom surface 306 of a sliding tray 304 may be constructed of a material which results in a sliding tray 304 remaining stationary as a remainder of the mousepad 300 may be displaced.

Figure 8:
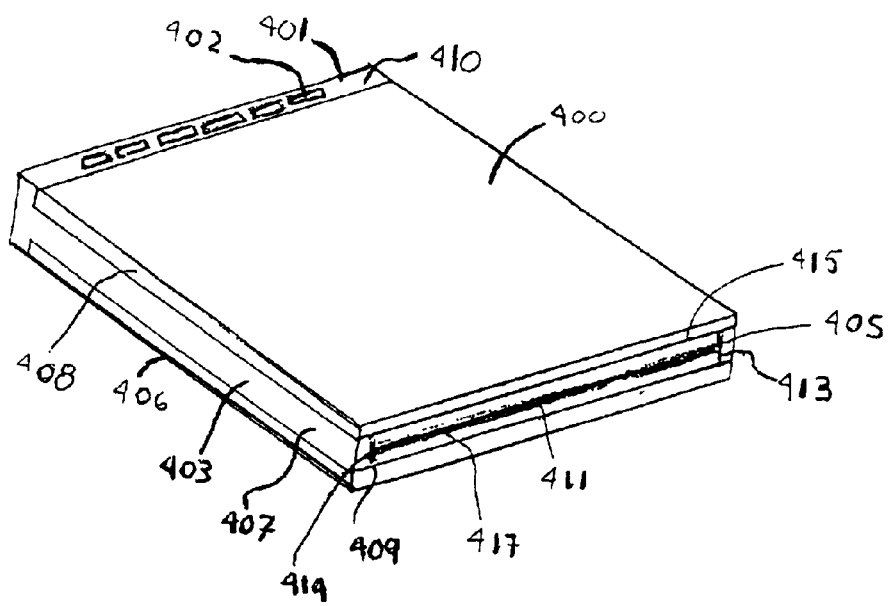
FIG. 8 illustrates a perspective view of an alternate embodiment of a mousepad of the present invention.

As shown in FIG. 8, another embodiment of a mousepad 400 may include a frame 410 within the mousepad 400 having an outside surface 403 and inside surface 405. The frame 410 may have a substantially rectangular cross-section defining an enclosure 411. The frame 410 may contain a base defining a storage cavity enclosure 411, an upper planar frame member 215 and four sidewalls 407. A slidable tray 404 may be contained within an opening 417 extending from a sidewall 407 of the frame 410. A horizontal track 414 may be located on two opposite sidewalls 407 of the frame 410 for guiding the slidable tray 404. The track 414 may contain flanges 413 to guide the motion of the sliding tray 404 and secure the sliding tray 404 in a locked position.

The mousepad 400 may include a first layer 406 attached to the base 409 of the frame 410. A second layer 408 may be attached to the top surface of the frame 410.

Figure 9:
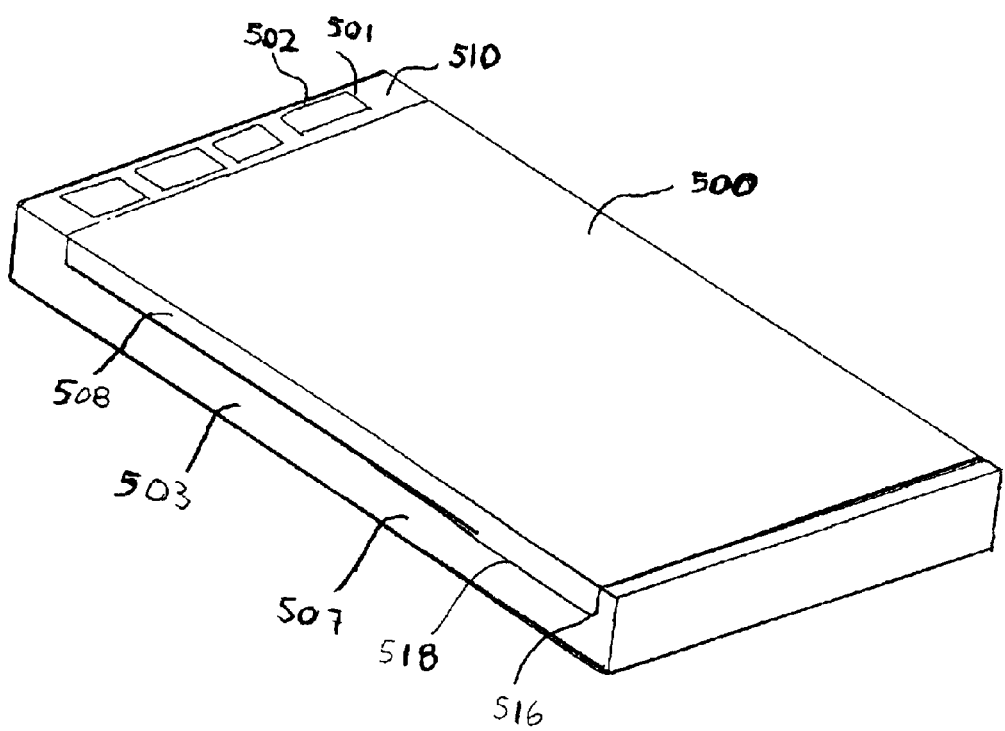
FIG. 9 illustrates a perspective view of an alternate embodiment of a mousepad of the present invention.

FIG. 9 illustrates a mousepad 500 that may be removably attached to a frame 510 containing a slidable tray 504. The slidable tray 504 may include a writing surface 512. The frame 510 may be constructed in a manner substantially as previously described with reference to FIG. 6. The frame 510 may contain an upper surface 517 having an indentation 516 for the placement of a foam surface thereon. A foam surface suited for mouse motion or a commonly available mousepad of standard size may be interchangeably placed upon the frame 510 in the indentation 516.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for storing information, the apparatus comprising:

a mousepad having an opaque top layer;

a surface on which the information is written wherein the surface is situated below the opaque top layer of the mousepad in a first position wherein the surface has a planar area substantially equal in size to a planar area of the opaque top layer; and a tray that slides to a second position to expose the surface on which the information is written from under the opaque top layer of the mousepad.

2. The apparatus of claim 1 further comprising:

a locking device associated with the tray that locks the tray in the first position.

3. The apparatus of claim 1 wherein the tray is in the mousepad in a concealed position.

4. The apparatus of claim 1 further comprising:

a frame having an indentation for placing a pad thereon.

5. A method for using a mousepad and for storing information, the method comprising the steps of:

providing a mousepad having an opaque top layer and a surface on which the information is written below the opaque top layer of the mousepad in a first position wherein the opaque top layer has a surface area substantially equal in size to a surface area of the surface on which the information is written; and providing a tray that slides between the first position and a second position wherein the second position exposes the surface on which the information is written from under the opaque top layer of the surface on which the information is written.

6. The method of claim 5 further comprising the step of:

providing a security device.

7. The method of claim 5 further comprising the step of:

providing a grid on the surface on which the information is written.

* * * * *